(12) United States Patent
Hsu

(10) Patent No.: US 7,445,365 B1
(45) Date of Patent: Nov. 4, 2008

(54) POSITION ADJUSTMENT DEVICE FOR HEADLIGHT OF CAR

(75) Inventor: Shou-Kang Hsu, Dacun Township, Changhua County (TW)

(73) Assignee: Lezi Enterprise Co., Ltd., Changhua County (TW)

( * ) Notice: Subject to any disclaimer, the term of this patent is extended or adjusted under 35 U.S.C. 154(b) by 0 days.

(21) Appl. No.: 11/782,128

(22) Filed: Jul. 24, 2007

(51) Int. Cl.
*F21V 9/02* (2006.01)

(52) U.S. Cl. .................. 362/524; 362/286; 362/289; 362/526

(58) Field of Classification Search .......... 362/272, 362/273, 286, 289, 386, 421, 422, 423, 424, 362/523, 524, 526, 528, 529, 530, 531, 532
See application file for complete search history.

(56) References Cited

U.S. PATENT DOCUMENTS 4,843,523 A * 6/1989 Nakamura .................. 362/273

5,186,531 A * 2/1993 Ryder et al. ................. 362/524

FOREIGN PATENT DOCUMENTS

DE         3445703 A1 *  6/1985

* cited by examiner

*Primary Examiner*—Y My Quach Lee
(74) *Attorney, Agent, or Firm*—Alan Kamrath; Kamrath & Associates PA

(57) ABSTRACT

A position adjustment device includes a housing, a limit rod, a movable rod, a rotation knob, a linking member, a driven member, a worm wheel, a direct-current motor, and a circuit board. Thus, the movable rod is movable to adjust the position and projecting angle of the headlight so that the direction of the headlight can be adjusted according to the slope of the road so as to provide a larger illuminating zone and a better viewing angle, thereby protecting the driver's safety when driving the car. In addition, the position and angle of the headlight is adjusted manually or in a motorized manner, thereby facilitating the user adjusting the direction of the headlight.

18 Claims, 8 Drawing Sheets

US 7,445,365 B1

POSITION ADJUSTMENT DEVICE FOR HEADLIGHT OF CAR

BACKGROUND OF THE INVENTION

1. Field of the Invention

The present invention relates to an adjustment device and, more particularly, to a position adjustment device for adjusting the position of a headlight of a car.

2. Description of the Related Art

A conventional car comprises headlights that project light beams forward to provide an illuminating effect to a driver at the night. Usually, the headlight has a fixed angle that is adjusted by the car factory and cannot be adjusted by the user. Thus, the direction of the headlight is only available for a common planar road. However, when the car is driven on a mountaineering road or a ghat, the direction of the headlight cannot be adjusted to fit the uphill or downhill angles of the road, so that the driver cannot see the uphill or downhill conditions of the road, thereby causing danger to the driver.

BRIEF SUMMARY OF THE INVENTION

In accordance with the present invention, there is provided a position adjustment device, comprising a housing, a limit rod mounted on a first side of the housing and having an inner wall formed with an inner thread and an outer wall formed with an outer thread, a movable rod mounted in the limit rod and having an outer wall formed with an outer threading screwed into the inner thread of the limit rod, a rotation knob rotatably mounted on a second side of the housing, and a linking member mounted in the housing and having a first end secured to and driven by the rotation knob and a second end secured to the movable rod to rotate the movable rod relative to the limit rod by rotation of the rotation knob so as to move the movable rod relative to the limit rod by engagement between the inner thread of the limit rod and the outer threading of the movable rod.

The primary objective of the present invention is to provide a position adjustment device that can adjust and regulate the projecting direction of a headlight of a car.

Another objective of the present invention is to provide a position adjustment device, wherein the movable rod is movable forward or rearward to adjust the position and projecting angle of the headlight upward or downward so that the direction of the headlight can be adjusted according to the slope of the road so as to provide a larger illuminating zone and a better viewing angle, thereby protecting the driver's safety when driving the car.

A further objective of the present invention is to provide a position adjustment device, wherein the position and angle of the headlight is adjusted manually or in a motorized manner, thereby facilitating the user adjusting the direction of the headlight.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
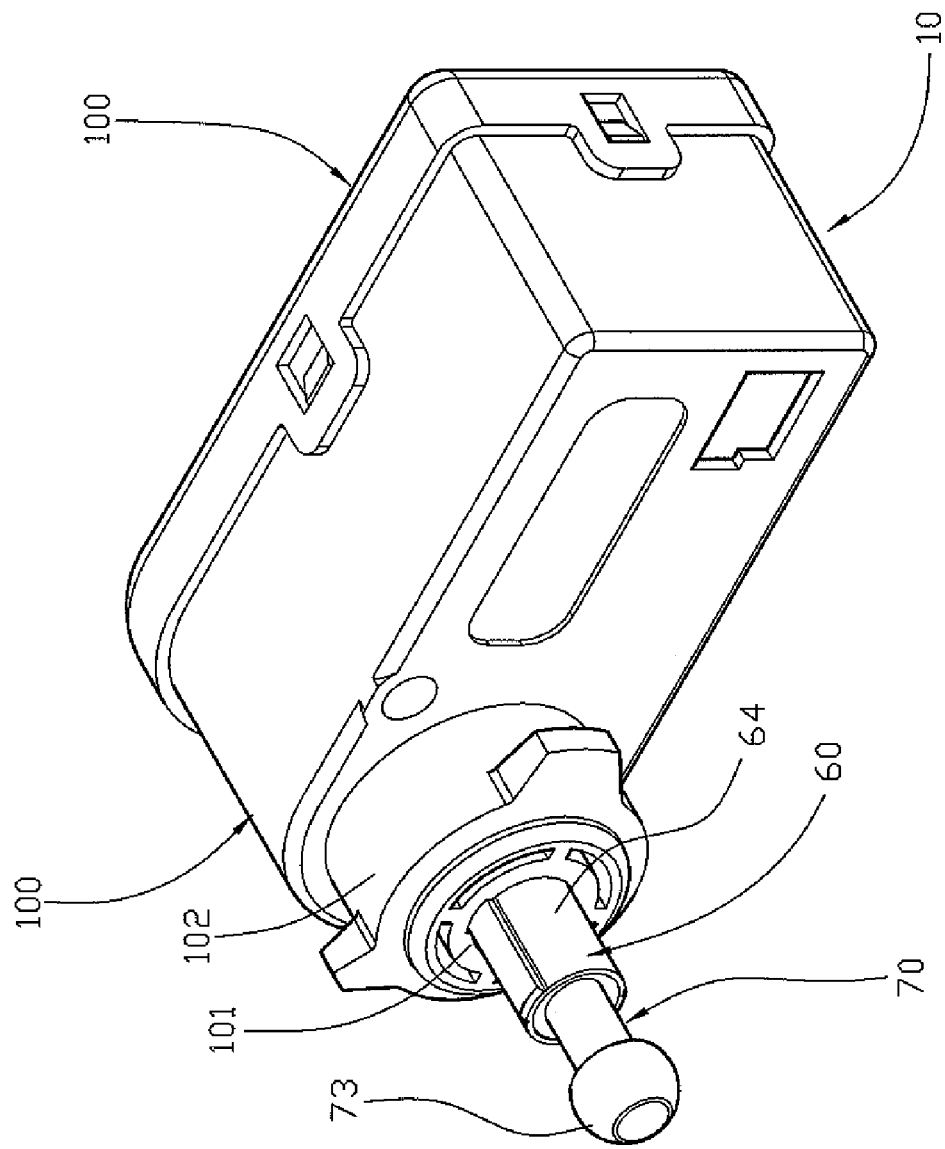
FIG. 1 is a perspective view of a position adjustment device in accordance with the preferred embodiment of the present invention.
Figure 2:
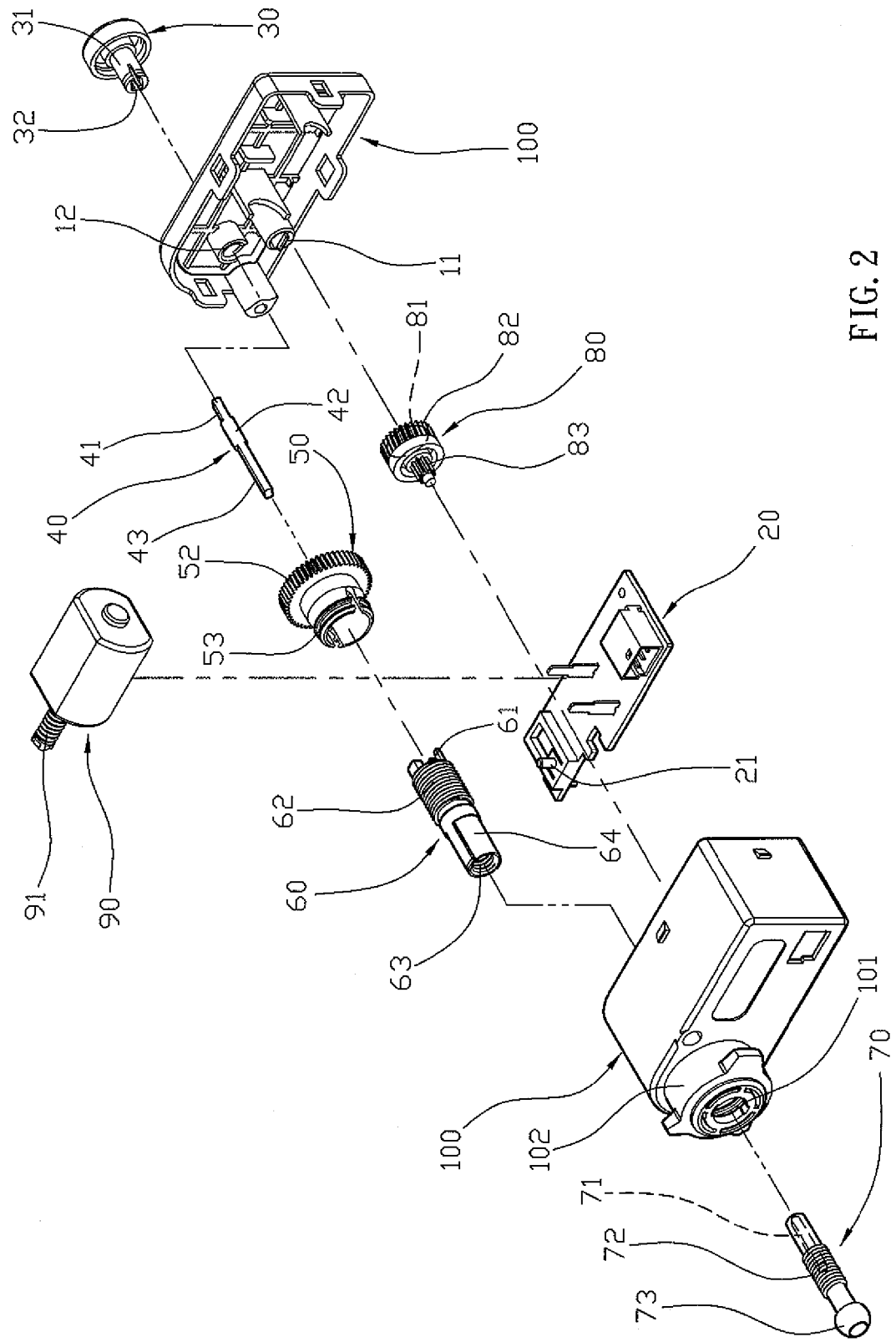
FIG. 2 is an exploded perspective view of the position adjustment device as shown in FIG. 1.
Figure 3:
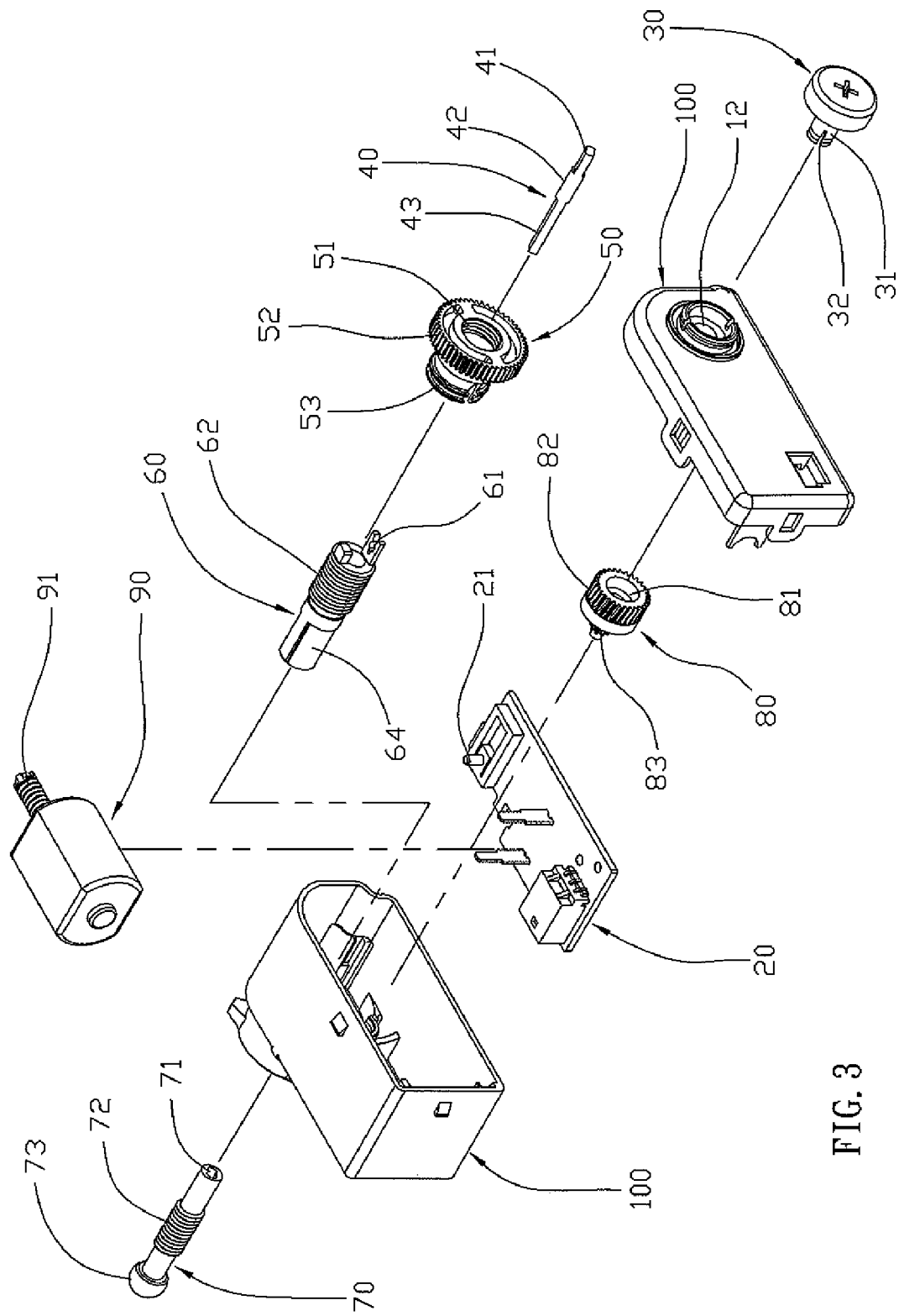
FIG. 3 is an exploded perspective view of the position adjustment device as shown in FIG. 1.
Figure 4:
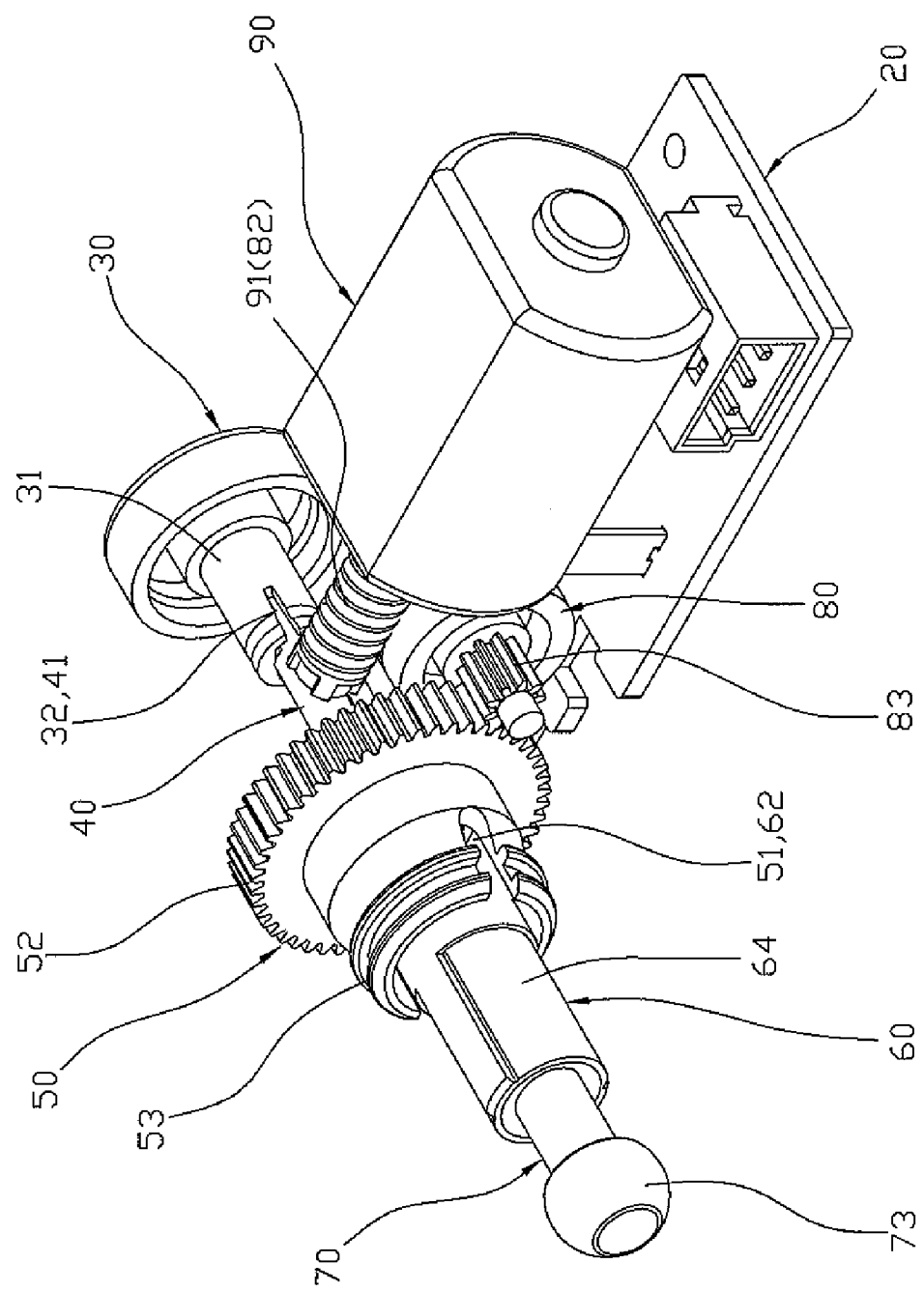
FIG. 4 is a perspective broken view of the position adjustment device as shown in FIG. 1.
Figure 5:
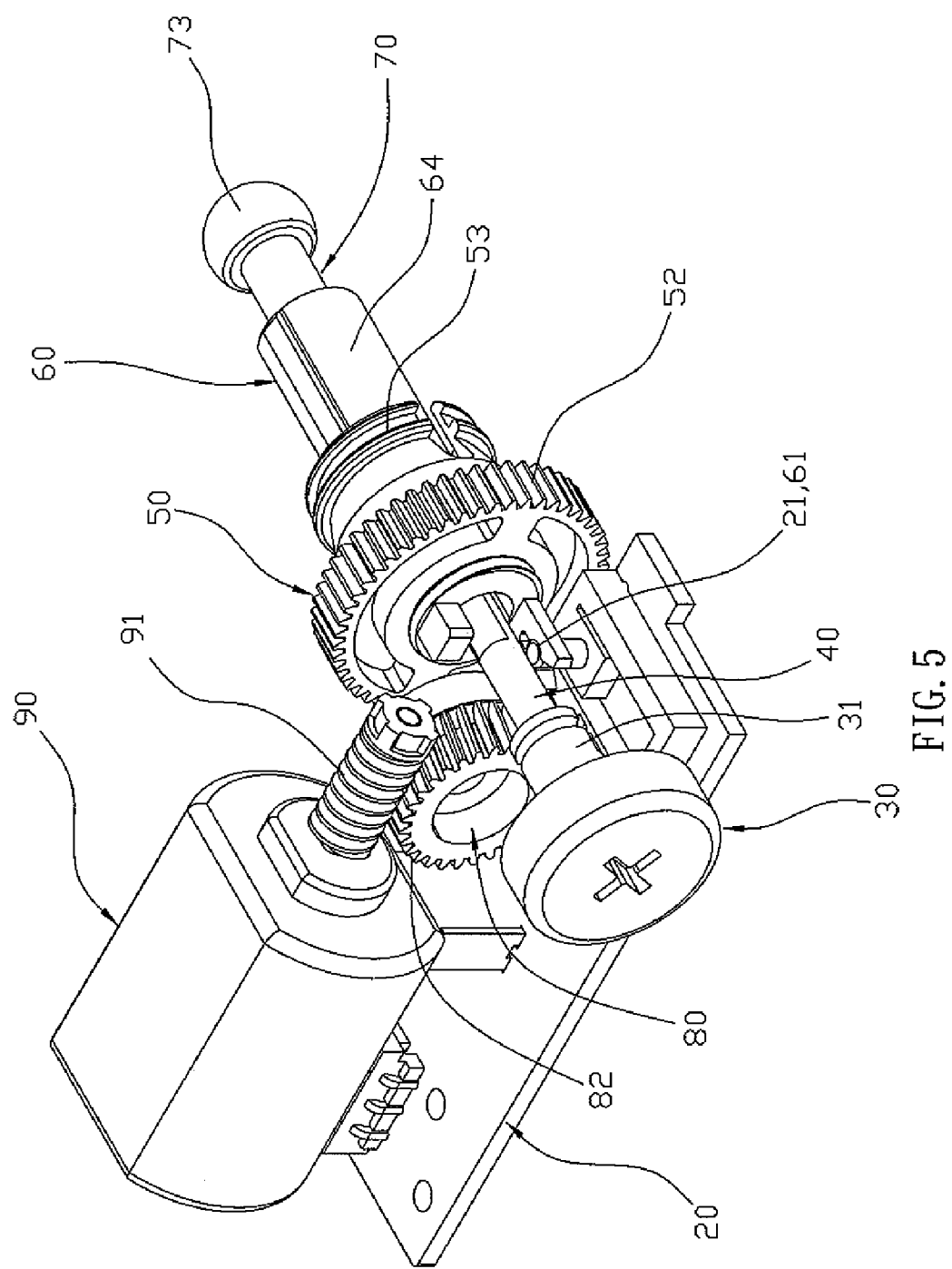
FIG. 5 is a perspective broken view of the position adjustment device as shown in FIG. 1.
Figure 6:
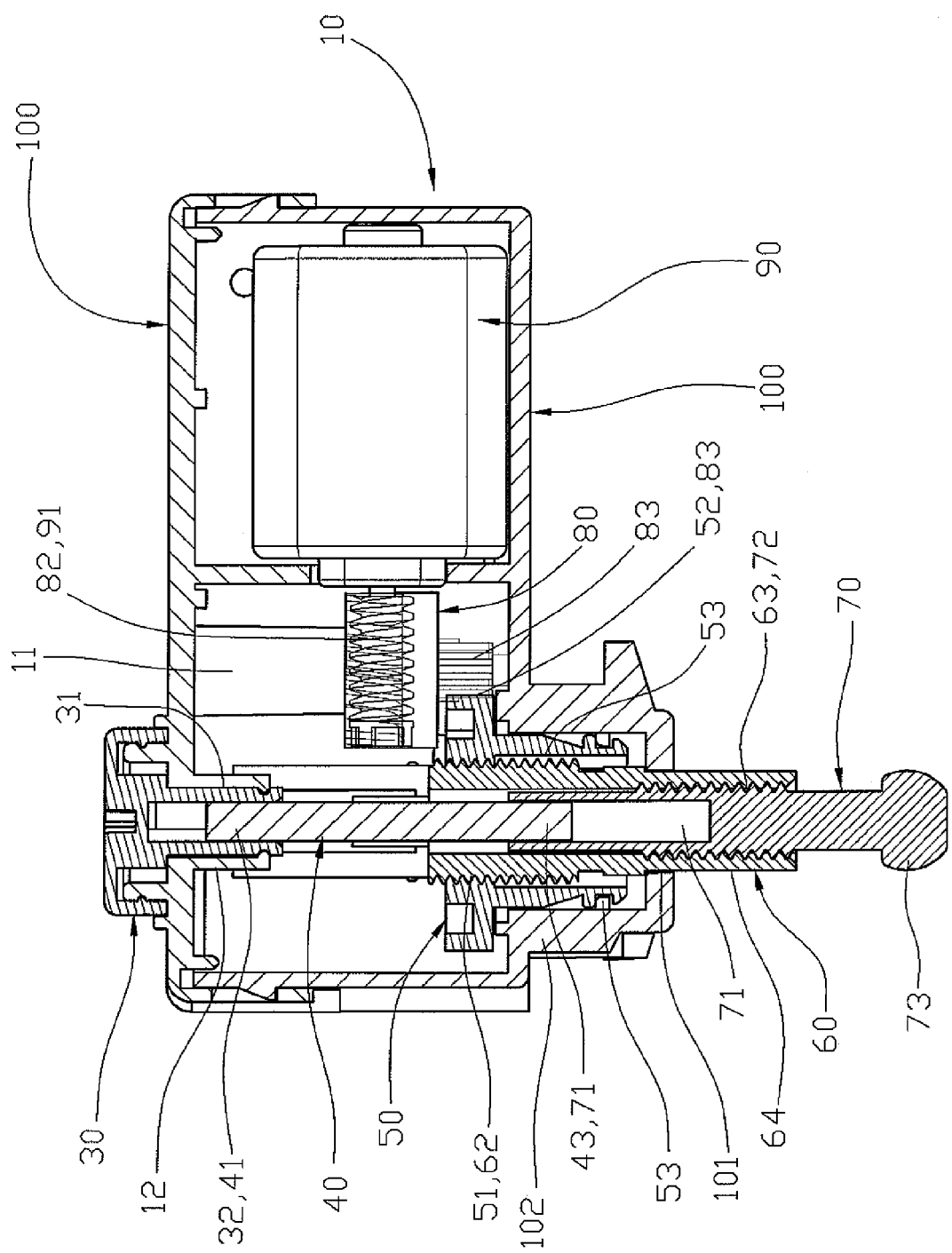
FIG. 6 is a top cross-sectional view of the position adjustment device as shown in FIG. 1.

Referring to the drawings and initially to FIGS. 1-6, a position adjustment device in accordance with the preferred embodiment of the present invention comprises a housing 10, a limit rod 60 mounted on a first side of the housing 10 and having an inner wall formed with an inner thread 63 and an outer wall formed with an outer thread 62, a movable rod 70 mounted in the limit rod 60 and having an outer wall formed with an outer threading 72 screwed into the inner thread 63 of the limit rod 60, a rotation knob 30 rotatably mounted on a second side of the housing 10, a linking member 40 mounted in the housing 10 and having a first end 41 secured to and driven by the rotation knob 30 and a second end 43 secured to the movable rod 70 to rotate the movable rod 70 relative to the limit rod 60 by rotation of the rotation knob 30 so as to move the movable rod 70 relative to the limit rod 60 by engagement between the inner thread 63 of the limit rod 60 and the outer threading 72 of the movable rod 70, a driven member 50 rotatably mounted in the housing 10 and having an inner wall formed with an inner threading 51 screwed onto the outer thread 62 of the limit rod 60 and an outer wall formed with a driven gear 52, a worm wheel 80 rotatably mounted in the housing 10 and having a first end formed with a driving gear 83 meshing with the driven gear 52 of the driven member 50 and a second end formed with a drive gear 82, a direct-current motor 90 mounted in the housing 10 and provided with a worm 91 meshing with the drive gear 82 of the worm wheel 80 to rotate the worm wheel 80, and a circuit board 20 mounted in the housing 10 and connected to the direct-current motor 90 to control operation of the direct-current motor 90.

The housing 10 consists of two shells 100 combined with each other. The housing 10 has an inside formed with an inwardly protruding mounting tube 12 and an inwardly protruding mounting post 11. The first side of the housing 10 is formed with an outwardly protruding mounting stud 102 having an inside formed with a mounting hole 101.

The rotation knob 30 is protruded outwardly from the second side of the housing 10 and provided with a reduced insert 31 inserted into and rotatably mounted in the mounting tube 12 of the housing 10. The insert 31 of the rotation knob 30 has an inside formed with a non-circular locking hole 32 locked on the first end 41 of the linking member 40.

The linking member 40 has a mediate portion formed with an enlarged limit section 42 located beside the first end 41 of the linking member 40 and rested on the insert 31 of the rotation knob 30. The first end 41 of the linking member 40 has a non-circular shape, and the second end 43 of the linking member 40 also has a non-circular shape.

The movable rod 70 has a first end formed with a non-circular locking hole 71 locked on the second end 43 of the linking member 40 and a second end formed with an enlarged dome-shaped connecting portion 73 protruded outwardly from the limit rod 60 and the mounting hole 101 of the housing 10 and connected to a headlight (not shown) of a car. The second end 43 of the linking member 40 is extended through the limit rod 60 into the locking hole 71 of the movable rod 70. The outer threading 72 of the movable rod 70 is located between the locking hole 71 and the connecting portion 73.

The circuit board 20 is provided with a protruding limit post 21.

The limit rod 60 is movable relative to the housing 10 and is non-rotatable relative to the housing 10. The limit rod 60 is movably mounted in the mounting hole 101 of the housing 10 and has a first end provided with a slotted slide 61 protruded outwardly from the inner threading 51 of the driven member 50 and slidably mounted on the limit post 21 of the circuit board 20 to limit movement of the limit rod 60 relative to the housing 10 and a second end 64 protruded outwardly from the mounting hole 101 of the housing 10. Thus, the slide 61 of the limit rod 60 is limited by the limit post 21 of the circuit board 20 so that the limit rod 60 is non-rotatable relative to the housing 10.

The direct-current motor 90 is secured on the circuit board 20.

The second end of the worm wheel 80 has an inside formed with a mounting bore 81 mounted on the mounting post 11 of the housing 10.

The driven member 50 has a first side formed with the driven gear 52 and rested on a wall of the housing 10 and a second side formed with a plug 53 inserted into and rotatably mounted in the mounting stud 102 of the housing 10.

Figure 7:
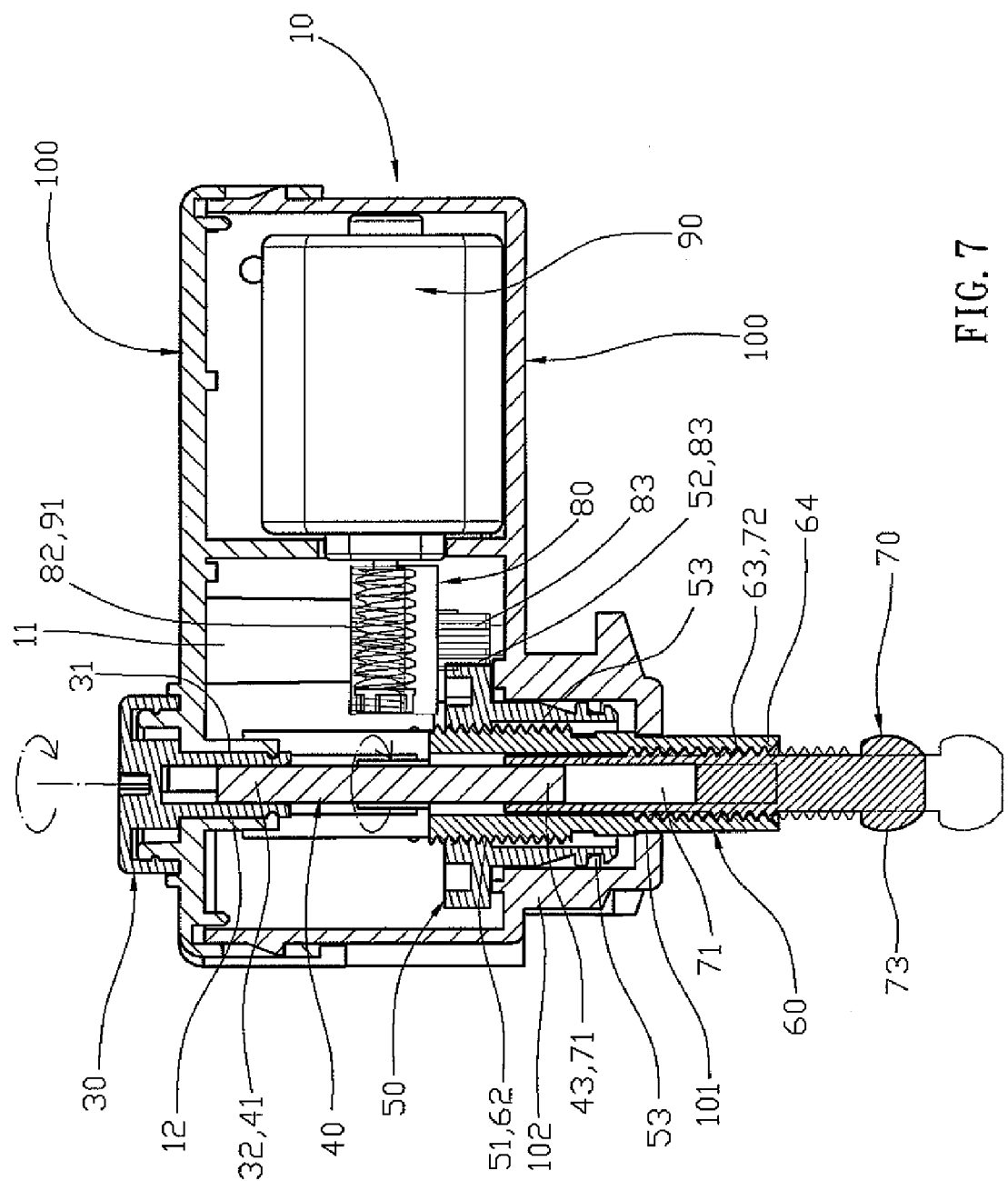
FIG. 7 is a schematic operational view of the position adjustment device as shown in FIG. 6.

In operation, referring to FIG. 7 with reference to FIGS. 1-6, the rotation knob 30 is rotatable relative to the housing 10 to rotate the linking member 40 to rotate the movable rod 70. At this time, the slide 61 of the limit rod 60 is limited by the limit post 21 of the circuit board 20 so that the limit rod 60 is non-rotatable relative to the housing 10. Thus, when the movable rod 70 is rotated by the linking member 40, the limit rod 60 is non-rotatable relative to the housing 10, and the movable rod 70 is rotatable relative to the limit rod 60 so that the movable rod 70 is movable forward or rearward relative to the limit rod 60 by engagement between the inner thread 63 of the limit rod 60 and the outer threading 72 of the movable rod 70 so as to adjust the position and angle of the headlight. In such a manner, a user can rotate the rotation knob 30 to adjust the position and angle of the headlight manually.

Figure 8:
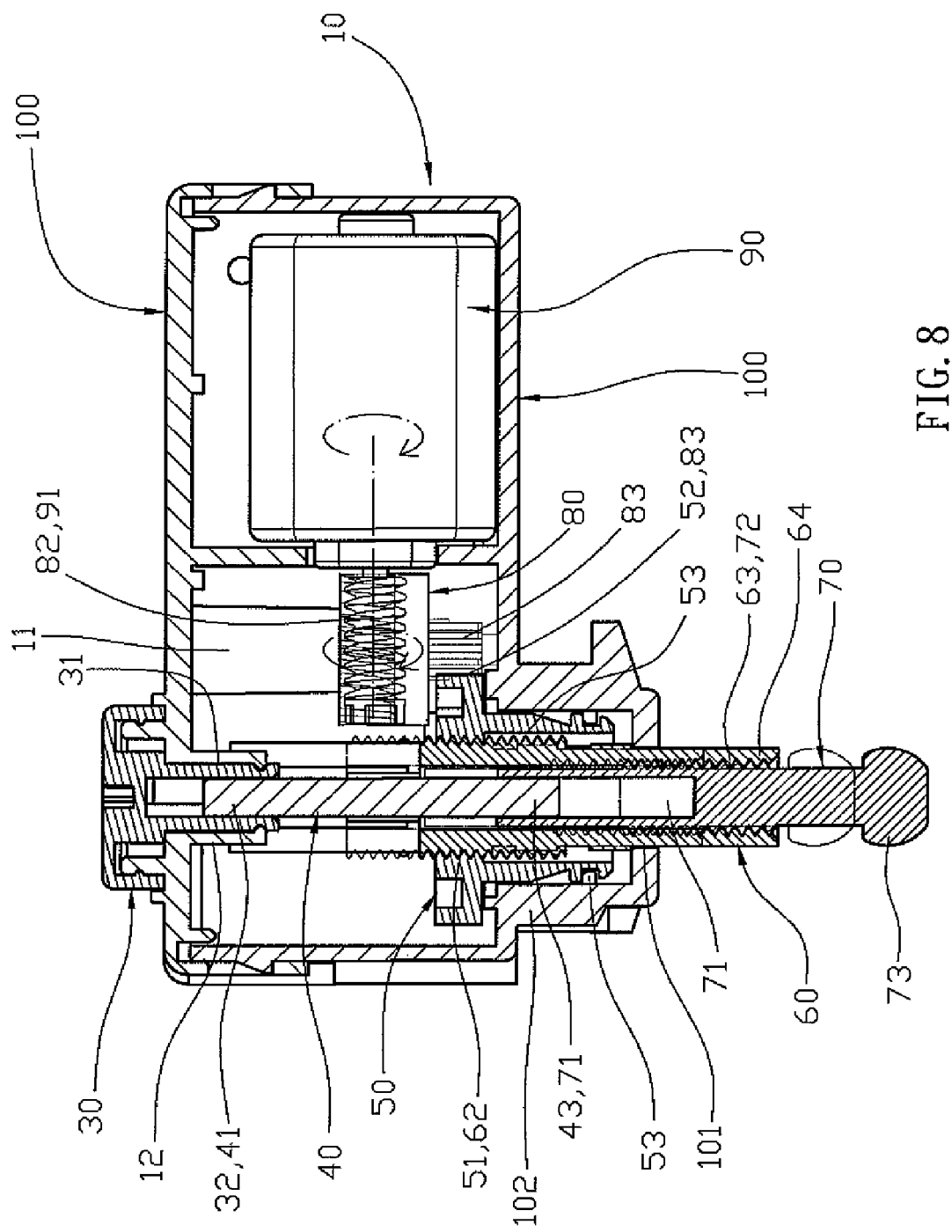
FIG. 8 is a schematic operational view of the position adjustment device as shown in FIG. 6.

Alternatively, referring to FIG. 8 with reference to FIGS. 1-6, the direct-current motor 90 is started by the circuit board 20 to rotate the worm 91 which rotates the drive gear 82 which rotates the driving gear 83 which rotates the driven gear 52 which rotates the driven member 50 which is rotatable relative to the housing 10. At this time, the slide 61 of the limit rod 60 is limited by the limit post 21 of the circuit board 20 so that the limit rod 60 is not rotatable with the driven member 50. Thus, when the driven member 50 is rotatable relative to the housing 10, the limit rod 60 is not rotatable with the driven member 50. At the same time, when the driven member 50 is rotatable relative to the housing 10, the limit rod 60 is movable forward or rearward relative to the driven member 50 by engagement between the outer thread 62 of the limit rod 60 and the inner threading 51 of the driven member 50, and the movable rod 70 is movable forward or rearward with the limit rod 60 simultaneously so as to adjust the position and angle of the headlight. In such a manner, the direct-current motor 90 is started by the circuit board 20 to adjust the position and angle of the headlight in a motorized manner. At this time, movement of the movable rod 70 is limited and guided by the linking member 40.

Accordingly, the movable rod 70 is movable forward or rearward to adjust the position and projecting angle of the headlight upward or downward so that the direction of the headlight can be adjusted according to the slope of the road so as to provide a larger illuminating zone and a better viewing angle, thereby protecting the driver's safety when driving the car. In addition, the position and angle of the headlight is adjusted manually or in a motorized manner, thereby facilitating the user adjusting the direction of the headlight.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A position adjustment device, comprising:
a housing;
a limit rod mounted on a first side of the housing and having an inner wall formed with an inner thread and an outer wall formed with an outer thread;
a movable rod mounted in the limit rod and having an outer wall formed with an outer threading screwed into the inner thread of the limit rod;
a rotation knob rotatably mounted on a second side of the housing;
a linking member mounted in the housing and having a first end secured to and driven by the rotation knob and a second end secured to the movable rod to rotate the movable rod relative to the limit rod by rotation of the rotation knob so as to move the movable rod relative to the limit rod by engagement between the inner thread of the limit rod and the outer threading of the movable rod;
a driven member rotatably mounted in the housing and having an inner wall formed with an inner threading screwed onto the outer thread of the limit rod and an outer wall formed with a driven gear;
a worm wheel rotatably mounted in the housing and having a first end formed with a driving gear meshing with the driven gear of the driven member and a second end formed with a drive gear;
a direct-current motor mounted in the housing and provided with a worm meshing with the drive gear of the worm wheel to rotate the worm wheel.

2. The position adjustment device in accordance with claim 1, further comprising a circuit board mounted in the housing and connected to the direct-current motor to control operation of the direct-current motor.

3. The position adjustment device in accordance with claim 2, wherein
the circuit board is provided with a protruding limit post;
the limit rod has a first end provided with a slotted slide protruded outwardly from the inner threading of the driven member and slidably mounted on the limit post of the circuit board to limit movement of the limit rod relative to the housing.

4. The position adjustment device in accordance with claim 3, wherein
the first side of the housing is formed with an outwardly protruding mounting stud having an inside formed with a mounting hole;
the limit rod has a second end protruded outwardly from the mounting hole of the housing.

5. The position adjustment device in accordance with claim 3, wherein the limit rod is movable relative to the housing and is non-rotatable relative to the housing;

the slide of the limit rod is limited by the limit post of the circuit board so that the limit rod is non-rotatable relative to the housing.

6. The position adjustment device in accordance with claim 3, wherein when the movable rod is rotatable, the limit rod is non-rotatable relative to the housing, and the movable rod is rotatable relative to the limit rod so that the movable rod is movable relative to the limit rod by engagement between the inner thread of the limit rod and the outer threading of the movable rod.

7. The position adjustment device in accordance with claim 3, wherein the slide of the limit rod is limited by the limit post of the circuit board so that the limit rod is not rotatable with the driven member when the driven member is rotatable relative to the housing;

when the driven member is rotatable relative to the housing, the limit rod is movable relative to the driven member by engagement between the outer thread of the limit rod and the inner threading of the driven member, and the movable rod is movable with the limit rod simultaneously.

8. The position adjustment device in accordance with claim 1, wherein the housing has an inside formed with an inwardly protruding mounting post;

the second end of the worm wheel has an inside formed with a mounting bore mounted on the mounting post of the housing.

9. The position adjustment device in accordance with claim 1, wherein the first side of the housing is formed with an outwardly protruding mounting stud having an inside formed with a mounting hole;

the driven member has a first side formed with the driven gear and rested on a wall of the housing and a second side formed with a plug inserted into and rotatably mounted in the mounting stud of the housing.

10. The position adjustment device in accordance with claim 1, wherein the rotation knob is protruded outwardly from the second side of the housing.

11. The position adjustment device in accordance with claim 1, wherein the direct-current motor is secured on the circuit board.

12. A position adjustment device, comprising:

a housing;

a limit rod mounted on a first side of the housing and having an inner wall formed with an inner thread and an outer wall formed with an outer thread;

a movable rod mounted in the limit rod and having an outer wall formed with an outer threading screwed into the inner thread of the limit rod;

a rotation knob rotatably mounted on a second side of the housing;

a linking member mounted in the housing and having a first end secured to and driven by the rotation knob and a second end secured to the movable rod to rotate the movable rod relative to the limit rod by rotation of the rotation knob so as to move the movable rod relative to the limit rod by engagement between the inner thread of the limit rod and the outer threading of the movable rod;

wherein the housing has an inside formed with an inwardly protruding mounting tube;

the rotation knob is provided with a reduced insert inserted into and rotatably mounted in the mounting tube of the housing;

the linking member has a mediate portion formed with an enlarged limit section located beside the first end of the linking member and rested on the insert of the rotation knob.

13. The position adjustment device in accordance with claim 12, wherein the first end of the linking member has a non-circular shape;

the insert of the rotation knob has an inside formed with a non-circular locking hole locked on the first end of the linking member.

14. A position adjustment device, comprising:

a housing;

a limit rod mounted on a first side of the housing and having an inner wall formed with an inner thread and an outer wall formed with an outer thread;

a movable rod mounted in the limit rod and having an outer wall formed with an outer threading screwed into the inner thread of the limit rod;

a rotation knob rotatably mounted on a second side of the housing;

a linking member mounted in the housing and having a first end secured to and driven by the rotation knob and a second end secured to the movable rod to rotate the movable rod relative to the limit rod by rotation of the rotation knob so as to move the movable rod relative to the limit rod by engagement between the inner thread of the limit rod and the outer threading of the movable rod;

wherein the first side of the housing is formed with an outwardly protruding mounting stud having an inside formed with a mounting hole;

the second end of the linking member has a non-circular shape;

the movable rod has a first end formed with a non-circular locking hole locked on the second end of the linking member and a second end formed with an enlarged connecting portion protruded outwardly from the limit rod and the mounting hole of the housing.

15. The position adjustment device in accordance with claim 14, wherein the connecting portion of the movable rod is dome-shaped.

16. The position adjustment device in accordance with claim 14, wherein the second end of the linking member is extended through the limit rod into the locking hole of the movable rod.

17. The position adjustment device in accordance with claim 14, wherein the outer threading of the movable rod is located between the locking hole and the connecting portion.

18. The position adjustment device in accordance with claim 14, wherein the limit rod is movably mounted in the mounting hole of the housing.

* * * * *